(12) United States Patent
Slough et al.

(10) Patent No.: US 7,527,726 B2
(45) Date of Patent: May 5, 2009

(54) FLUID TREATMENT APPARATUS

(75) Inventors: Kevin Slough, High River (CA); Troy Lupul, Calgary (CA)

(73) Assignee: Q'Max Solutions Inc., Calgary (CA)

( * ) Notice: Subject to any disclaimer, the term of this patent is extended or adjusted under 35 U.S.C. 154(b) by 312 days.

(21) Appl. No.: 11/307,143

(22) Filed: Jan. 25, 2006

(65) Prior Publication Data

US 2007/0170117 A1 Jul. 26, 2007

(51) Int. Cl.
*B01D 21/01* (2006.01)
*B01D 21/08* (2006.01)

(52) U.S. Cl. ............... 210/96.1; 210/113; 210/202; 210/208; 210/519; 210/522; 210/528; 175/206

(58) Field of Classification Search .......... 210/522
See application file for complete search history.

(56) References Cited

U.S. PATENT DOCUMENTS

| 2,118,157 | A | * | 5/1938 | Camp ............... 210/800 |
|---|---|---|---|---|
| 3,886,064 | A | * | 5/1975 | Kosonen ............ 209/157 |
| 4,056,477 | A | * | 11/1977 | Ravitts ............ 210/522 |
| 4,120,796 | A | * | 10/1978 | Huebner ............ 210/522 |
| 4,178,243 | A | * | 12/1979 | Messer ............. 210/709 |
| 4,194,976 | A | * | 3/1980 | Robinsky ........... 210/137 |
| 4,226,714 | A | * | 10/1980 | Furness et al. ..... 210/723 |
| 4,388,195 | A | * | 6/1983 | von Hagel et al. ... 210/709 |
| 4,431,535 | A |  | 2/1984 | Spruiell |
| 4,447,330 | A |  | 5/1984 | Babineaux, III |
| 4,482,459 | A |  | 11/1984 | Shiver |
| 4,507,208 | A |  | 3/1985 | Simon et al. |
| 4,536,293 | A |  | 8/1985 | Babineaux, III |
| 4,571,296 | A |  | 2/1986 | Lott |
| 4,595,504 | A | * | 6/1986 | Hellman et al. ..... 210/519 |
| 4,634,535 | A |  | 1/1987 | Lott |
| 4,636,308 | A |  | 1/1987 | Summers |
| 4,670,139 | A |  | 6/1987 | Spruiell et al. |
| 4,696,353 | A |  | 9/1987 | Elmquist et al. |
| 4,869,831 | A | * | 9/1989 | Hinkle, II .......... 210/744 |
| 4,871,454 | A |  | 10/1989 | Lott |
| 4,889,624 | A | * | 12/1989 | Soriente et al. ..... 210/232 |
| 4,913,585 | A |  | 4/1990 | Thompson et al. |
| 5,093,008 | A |  | 3/1992 | Clifford, III. |
| 5,145,256 | A |  | 9/1992 | Weimers et al. |
| 5,503,747 | A | * | 4/1996 | Vion et al. ......... 210/519 |
| 5,582,727 | A |  | 12/1996 | Foster |
| 5,605,636 | A | * | 2/1997 | Wyness ............. 210/801 |
| 5,620,600 | A | * | 4/1997 | Smati .............. 210/519 |
| 5,863,430 | A |  | 1/1999 | Williams |
| 6,220,445 | B1 |  | 4/2001 | Williams |
| 6,391,195 | B1 |  | 5/2002 | Layton |
| 6,533,946 | B2 |  | 3/2003 | Pullman |

(Continued)

FOREIGN PATENT DOCUMENTS

CA 1095433 12/1976

(Continued)

*Primary Examiner*—Peter A Hruskoci
(74) *Attorney, Agent, or Firm*—Bennett Jones LLP

(57) ABSTRACT

Processes and apparatuses for treating drilling fluid by passing the fluid through a separator including a clarifying zone and a thickening zone, the clarifying zone having inclined plates and the thickening zone having at least one wall with an angle of less than about 60°. The separator may optionally include an agglomeration zone and a removal zone.

28 Claims, 6 Drawing Sheets

U.S. PATENT DOCUMENTS

| | | | |
|---|---|---|---|
| 6,793,814 B2 * | 9/2004 | Fout et al. | 210/188 |
| 6,808,626 B2 | 10/2004 | Kulbeth | |
| 2005/0092671 A1 | 5/2005 | Mueller | |

FOREIGN PATENT DOCUMENTS

| | | |
|---|---|---|
| CA | 1097574 | 9/1977 |
| CA | 1111782 | 10/1978 |
| CA | 1120409 | 10/1978 |
| CA | 1120410 | 10/1978 |
| CA | 1127626 | 8/1980 |
| CA | 1267860 | 5/1987 |
| CA | 1308036 | 8/1989 |
| CA | 2184535 | 8/1996 |
| CA | 2200524 | 3/1997 |
| CA | 2217623 | 10/1997 |
| CA | 2219053 | 10/1997 |
| CA | 2256821 | 12/1998 |
| CA | 2322304 | 10/2000 |
| CA | 2433475 | 6/2003 |

* cited by examiner

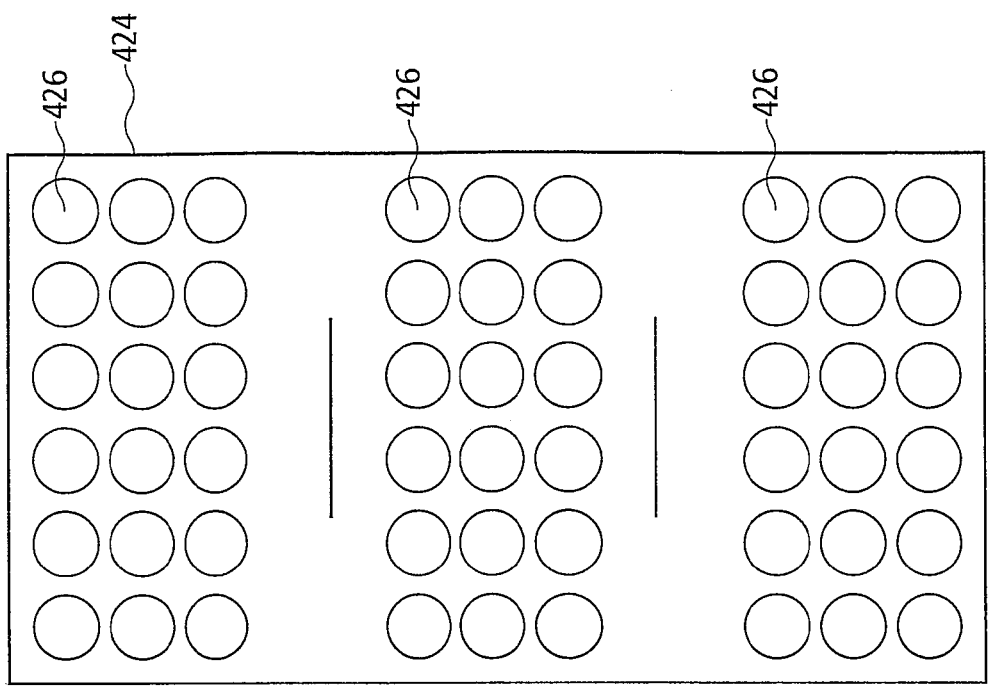
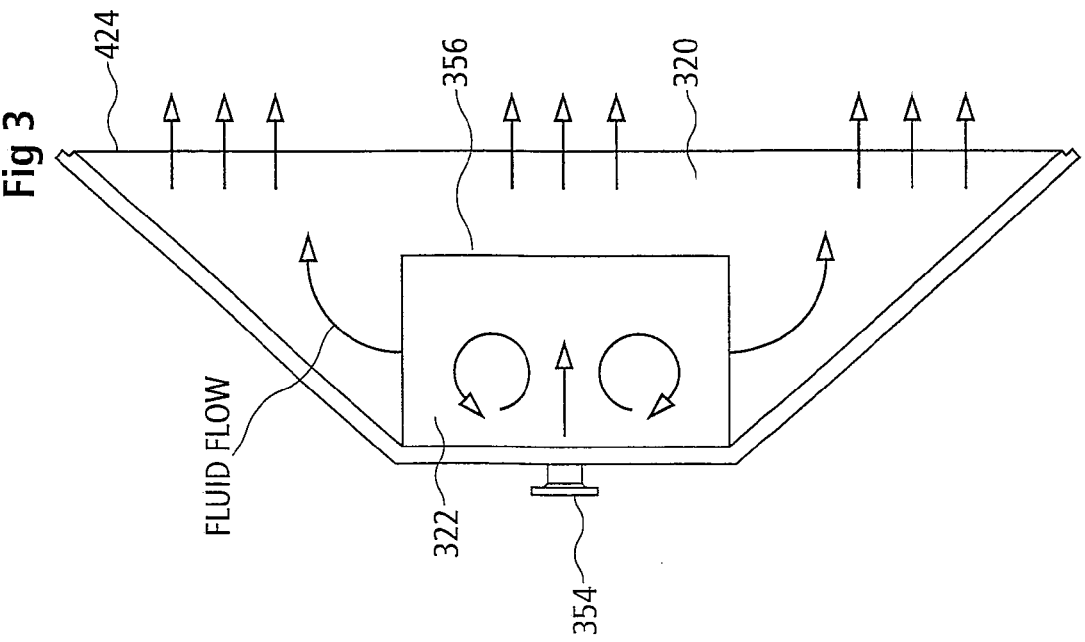

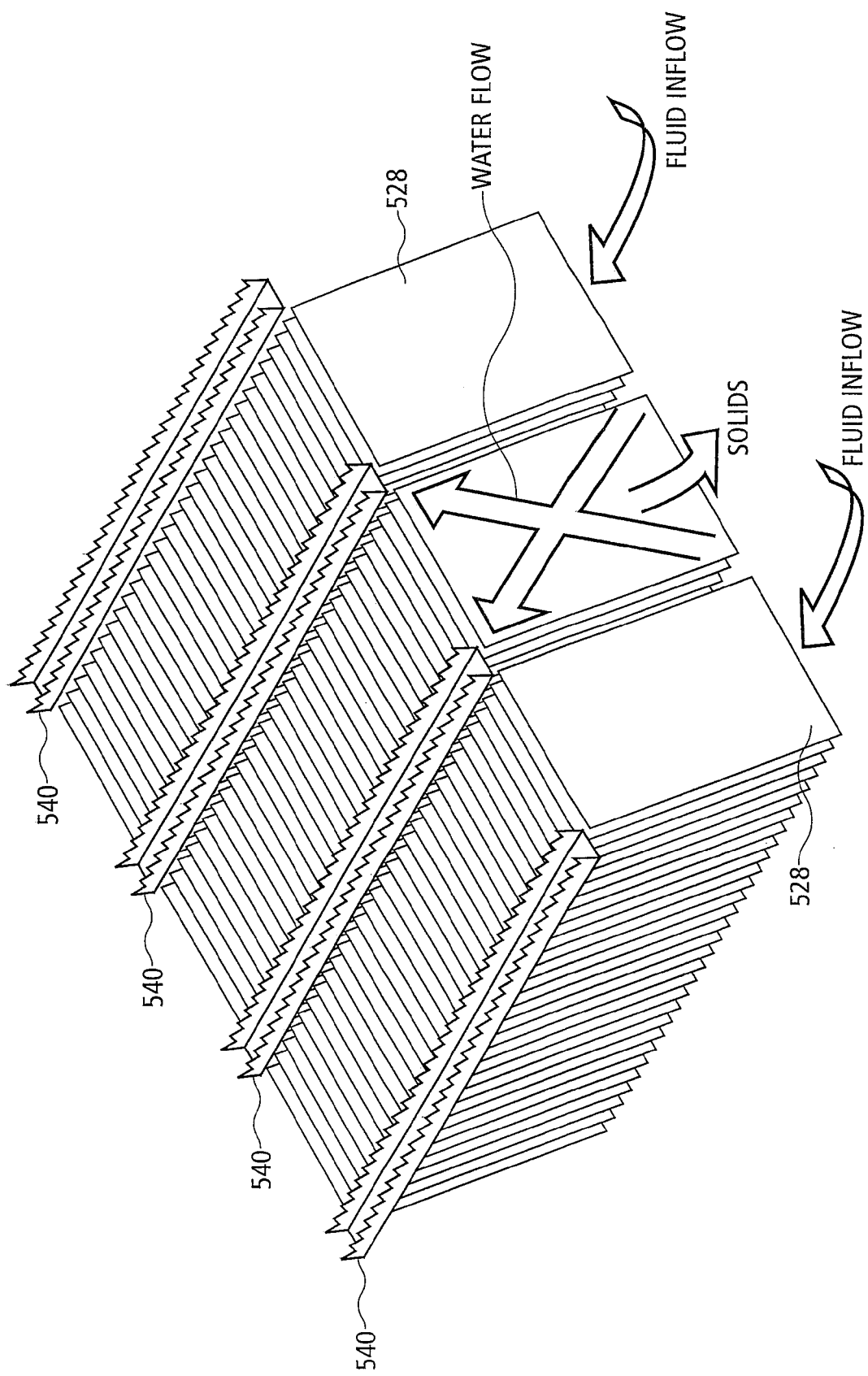

FLUID TREATMENT APPARATUS

FIELD OF THE INVENTION

The present invention relates to fluid treatment, more particularly to the treatment of water based drilling fluids used in oil and gas wells to produce a liquids fraction and a solids fraction.

BACKGROUND OF THE INVENTION

In drilling wells in hydrocarbon-producing formations, drilling fluid circulating in the drill string acts to dissipate heat from the drill bit, carry cuttings from the wellbore to the surface, transmit information about drilling conditions, and so forth. For reasons including cost reduction and environmental protection, it is desirable to treat used drilling fluid to separate the solids from liquid and to clarify the liquid to certain given standards. Drilling fluid treatment apparatus known in the art are often too unwieldy to be conveniently and economically used at the drilling site, while other known treatment processes often produce water that must be treated further to be sufficiently devoid of drilling impurities (for example, to satisfy environmental standards) and/or do not separate out sufficient amounts of clarified liquid thereby producing more dilute than necessary amounts of waste sludge.

SUMMARY OF THE INVENTION

In one aspect of the invention, there is provided a process for treating drilling fluid, which contains solids and liquids, to produce a clarified liquid. In one embodiment of the inventive process, this includes introducing a stream of drilling fluid into at least one primary separator to separate first size solids and produce a solids fraction and a secondary fluid stream comprising liquids and second size solids. The embodiment of the process would further comprise providing a secondary separator, which includes an upper clarifying zone having a plurality of spaced apart clarifying plates and a lower thickening zone having a lower end, where the lower end has a downwardly diminishing cross-sectional area and includes at least one wall angled no more than 60°, and wherein the upper clarifying zone and the lower thickening zone are in fluid communication with each other. In accordance with the embodiment of the process, the secondary fluid stream is introduced into the clarifying zone at a position at or below a top end of the clarifying plates and allowed to flow among the clarifying plates, and the second size solids would be permitted to contact the clarifying plates and settle downwardly from the clarifying plates into the thickening zone to form a settled solids zone in the lower end of the thickening zone and a clarified liquid zone in the clarifying zone. In accordance with another embodiment of the inventive process, the thickening zone wall has an angle of up to 45°, and a displacer is disposed proximally parallel to that wall. In some embodiments, the process further comprises providing an agglomeration zone in fluid communication with the clarifying zone, and introducing the secondary fluid stream into the agglomeration zone prior to its passage into the clarifying zone.

In another aspect of the invention, there is provided an apparatus for treating fluid comprising solids and liquids to produce clarified fluid. In an embodiment of this aspect of the invention, the apparatus includes a clarification zone in fluid communication with the agglomeration zone having a plurality of spaced-apart clarifying plates to promote the settling of the solids from the clarification zone to produce clarified fluid, and a thickening zone disposed below and in fluid communication with the clarifying zone for receiving the settling solids. The thickening zone includes at least one wall defining a downwardly diminishing cross-sectional area and having an angle of no more than 60°. In some embodiments of the inventive apparatus, the thickening zone wall has an angle of no more than 45°, and the apparatus further includes a displacer disposed proximally parallel to the wall for displacing solids from the thickening zone wall; and, a removal zone for collecting and removing settled solids, which is disposed proximal to a bottom edge of the thickening zone wall. In various embodiments, the apparatus includes an agglomeration zone for mixing agglomerant into the fluid to agglomerate the solids.

In yet a further aspect of the invention, there is provided an energy displacement apparatus for fluid in a fluid flow path, the apparatus being disposed in a fluid conduit and including a fluid inlet, a flow path obstacle disposed in substantially facing relation to the fluid inlet and having two ends, and at least one fluid outlet disposed proximally perpendicular to at least one end.

BRIEF DESCRIPTION OF THE DRAWINGS

FIG. 3 is a top view of an embodiment of an energy displacement sub-zone.

FIG. 4 is side elevation detail of an embodiment of a diffuser.

FIG. 5 is a perspective view of a plate and launder assembly.

DETAILED DESCRIPTION OF THE INVENTION

Figure 1:
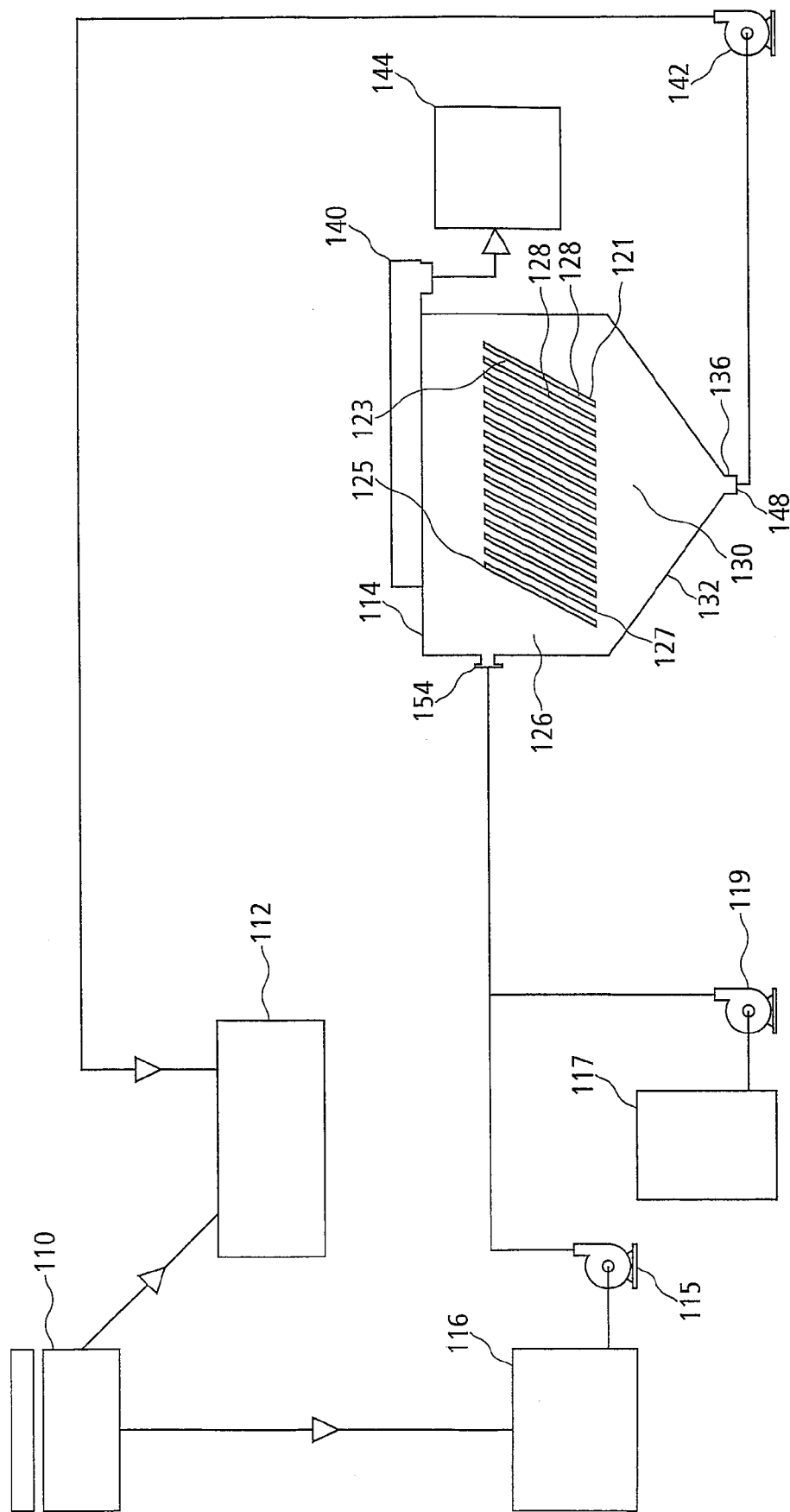
FIG. 1 is a flow diagram representing an embodiment of the inventive process.

Referring to FIG. 1, in an embodiment of the inventive process, the primary stream of drilling fluid from the annulus of a wellbore may be passed through a primary separator 110 to separate large solids, for example, drill cuttings, from a fluid fraction, which primary separator may be one or more of the following in any combination: a shale shaker, hydrocyclone, centrifuge, or some other separator of coarse solids. The solids that are separated out in this primary separator 110 may be disposed into a solids disposal unit 112 such as a solids tank.

The fluid fraction obtained from the primary separator (also referred to as a secondary fluid stream) may then be introduced into a secondary separator 114 to separate the finer solids from the liquid. Prior to introducing the secondary fluid into the secondary separator, the secondary fluid fraction may be first passed into a receiving tank or pump box 116 in order to control the flow of the secondary fluid stream to the secondary separator 114 by pump 115. In the embodiment shown in FIG. 1, agglomerant or flocculant stored in agglomerant tank 117 can also be added to the secondary fluid stream via pump 119 prior to the introduction of the secondary fluid stream into the secondary separator 114 via inlet 154. In another embodiment (not shown), agglomerant can be added either prior to the secondary fluid stream entering the receiving tank or directly into the receiving tank; in such an embodiment, a pump (such as pump 119) may be excluded from the process in order to avoid the shearing apart of agglomerated solids in the fluid stream. In this embodiment, secondary fluid stream may be gravity fed to the secondary separator.

Secondary separator 114 has at least two distinct zones, a clarifying zone 126 and a thickening zone 130, each zone being in fluid communication with each other. Secondary fluid stream is initially introduced into a clarifying zone 126 having a plurality of inclined plates 128, which plates 128 have underside surfaces 121 (those oriented in substantially facing relation with the bottom of the separator 114) and top surfaces 123 (those oriented in substantially facing relation with the top of the separator 114). The plates may be oriented at an angle between 0° and 90° from the horizontal, and may in some embodiments be oriented at about 60° from the horizontal. In some embodiments, the plates may be mounted in guide channels provided in the clarifying zone. The secondary fluid stream may be introduced into the clarifying zone 126 below the top edges 125 of the plates 128 via inlet 154 as shown in FIG. 1; in some embodiments, the secondary fluid stream may be introduced below the bottom edges 127 of the plates and also along the sides of the plates so that it flows into the spaces between the plates.

As the level of the secondary fluid stream in the clarifying zone rises, the fluid is permitted to flow among the inclined plates 128, whereupon solids in the fluid stream that strike the undersides 121 of the plates 128 are detained from rising further and solids striking the top surfaces 123 of the plates 128 may be guided down along the plate surface, with the result that such contact assists in settling out solids carried in the secondary fluid stream.

As solids settle, they settle onto removal zone wall 132 of the thickening zone 130 disposed below the clarifying zone 126. The weight of the settling solids compresses the layers of solids closest to the removal zone wall 132 thereby removing additional water from the compacting solids layers. As the solids settle and compact, the remaining liquid portion of the secondary fluid stream becomes increasingly clarified. The clarified liquid about the top edges of the plates 128 may then exit the clarifying zone 126 by clarified liquid removal means 140, which is shown as a launder in FIG. 1. A plurality of launders can be used and the co-operation of the inclined plates and launders can be seen in more detail in FIG. 5. Referring to FIG. 5, the clarified liquid may flow over the tops of the plates 528 into the launders 540, and then flow out of the launders 540 by, for example, gravity. A person skilled in the art would understand that the clarified liquid may be drawn out of the clarifying zone by other removal means, such as for example a skimmer.

Returning again to FIG. 1, the clarified liquid may then be passed into a holding tank such as clarified liquid tank 144. The clarified liquid may ultimately be reused in drilling mud or put to other uses. In some instances, the clarified liquid may be subjected to further treatment. Solids settling into the thickening zone 130 may be passed from an open bottom end 148 of the thickening zone 130 into a removal zone 136 associated with the end 148. In the embodiment shown in FIG. 1, the settled solids may be drawn out of the removal zone 136 by a solids pump 142, whereupon the settled solids may be subjected to further de-aeration and dewatering, inspected, recycled, or discarded into the solids disposal unit 112. In another embodiment, the solids may be removed from removal zone 136 by gravity. In a further embodiment, the thickening zone may have a closed bottom end but be detachable and the solids removed accordingly. The thickening zone 130 into which solids (whether agglomerated or not) from the secondary fluid stream may settle includes at least one wall 132 angled at no more than 60° from the horizontal; the angle of the at least one wall 132 defines a downwardly diminishing surface area of the thickening zone 130. In some embodiments of the invention, the angle of the at least one wall is steep enough to encourage settled solids to fall towards the removal zone, such as for example in the range of about 45° to 60°, while generally speaking the slope of the wall tends to promote the concentration of the settled solids.

It is understood that in some circumstances, it may not be necessary to add agglomerants. However, for those embodiments of the invention in which solids within the fluid stream are of such size that they are colloidal and will remain suspended almost indefinitely due to van der Waals effects etc., agglomerating means such as coagulants and flocculants may be used to agglomerate the suspended and colloidal solids. The solids may then more easily separate from the fluid stream and settle out. Polymers such as acrylates, acrylamides and partially-hydrolyzed polyacrylamides (such as, for example, ALKAPAM™) may be suitable flocculants. Agglomerants may be introduced into the fluid stream as it flows toward the secondary separator. In some embodiments it may be desirable to thoroughly mix the coagulant and/or flocculant with the fluid stream in an agglomeration zone prior to allowing the fluid stream to enter into the clarifying zone. Such an agglomeration zone may be a component of the secondary separator or it may comprise some other component of the system; for example, in embodiments provided with a receiving tank (such as receiving tank 116 in FIG. 1), the receiving tank may further function as an agglomeration zone. However, an agglomeration zone would not be necessary in all embodiments; in some embodiments, the agglomerant may even be introduced into the fluid stream immediately prior to the fluid stream's entry into the clarifying zone or directly into the clarifying zone. In various embodiments of the invention, such as that shown in FIG. 1, an agglomerant tank 117 may be associated with the fluid flow path in order to release agglomerant into the fluid stream.

Figure 2:
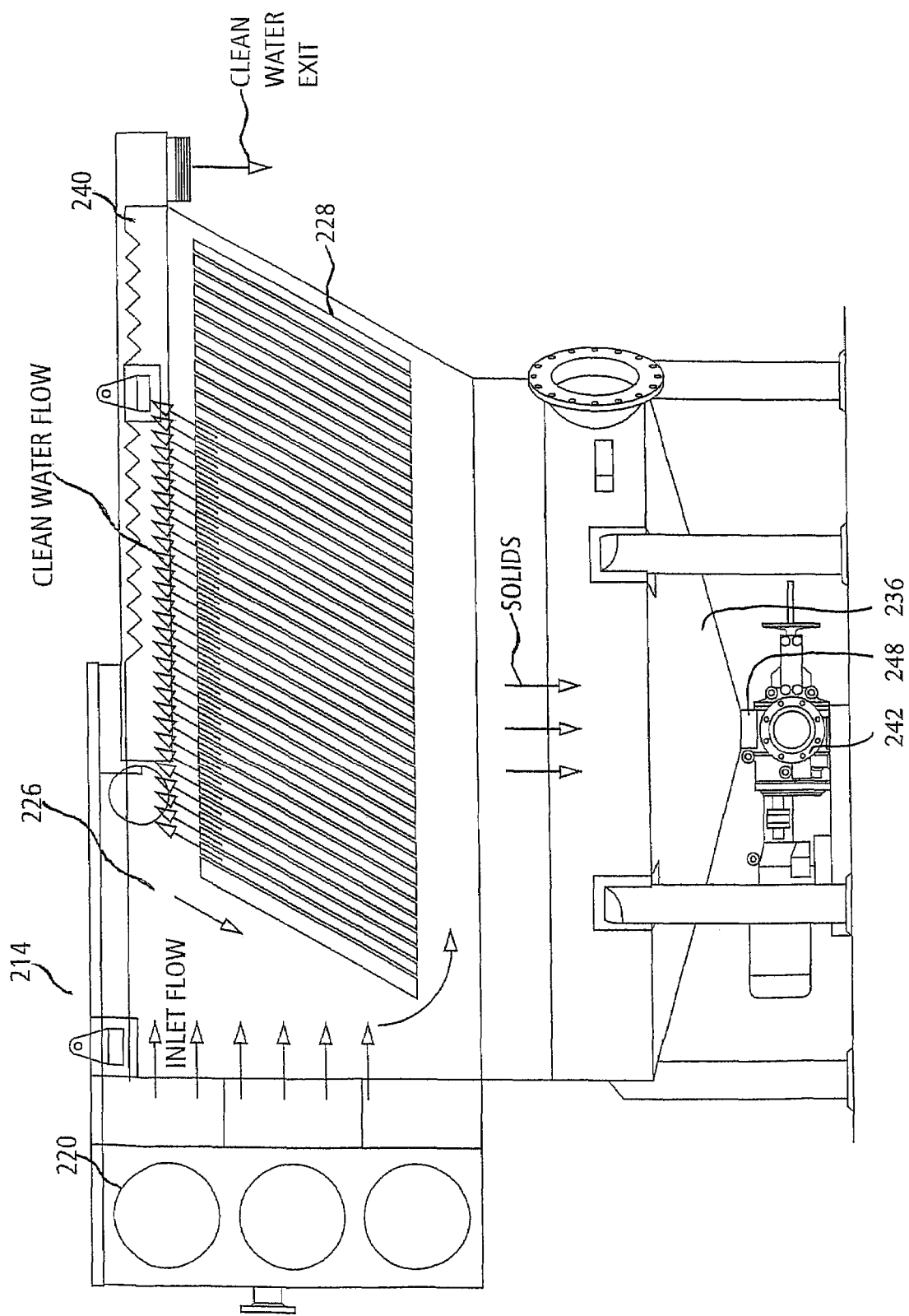
FIG. 2 is a side elevation view of an embodiment of a secondary separator.

The secondary separator of FIG. 1 may optionally be replaced with a secondary separator as shown in FIG. 2. Referring to FIG. 2, an agglomeration zone 220 is provided in the secondary separator 214 to provide mixing flocculant or other agglomerants with the fluid stream, such that the agglomeration zone 220 precedes, and is contiguous with (i.e., in fluid communication with), the clarifying zone 226 in the fluid flow path. Whether or not an agglomeration zone is provided may be influenced by the size and concentration of the solids remaining suspended in the fluid stream; for example, if the solids remaining in the secondary fluid stream are very small or colloidal, it may be more desirable to have an agglomeration zone. The secondary separator 214 comprises a plurality of inclined plates 228 in the clarifying zone 226 and a clarified fluids removal means 240, such as one or more launders, for collecting and removing clarified liquid from the clarifying zone 226. Solids are collected and compacted in thickening zone 230, which is in fluid communication with clarifying zone 226, and removed through the removal zone 236 via outlet 248. Once again, FIG. 5 shows an embodiment in greater detail of an assembly of plates 528 and launders 540.

The agglomeration zone may further include an intermixing sub-zone wherein the agglomerant is rapidly mixed into the fluid stream, which may or may not be further defined with physical boundaries. In such embodiments, flocculant or other agglomerant may be introduced either upstream of the intermixing sub-zone or at that sub-zone and the fluid flow in the intermixing sub-zone may have a turbulent or rolling motion. For those embodiments in which a rapid fluid flow rate into the agglomeration zone is contemplated, it may be desirable to reduce the energy of the fluid flow prior to introduction of the fluid into the clarifying zone; in such embodiments, the intermixing sub-zone further comprises an obstacle such as a wall disposed in the flow path. In this instance, the intermixing sub-zone would also act an energy displacement sub-zone. A top view of an embodiment of an energy displacement sub-zone 322 is shown in FIG. 3. Referring to FIG. 3, the fluid entering through inlet 354 would strike the wall 356, to prevent the secondary fluid from rushing directly into the clarifying zone and to ensure a residence time in the agglomeration zone sufficient for solids to agglomerate (for example, into flocs). Thus, the turbulent flow of the fluid within the energy displacement sub-zone 322 results in the dissipation of some of the energy of the fluid prior to departure of the fluid into the rest of the agglomeration zone. In embodiments wherein such energy displacement is unnecessary, the intermixing sub-zone may instead be provided with agitators to cause sufficient mixing of the agglomerant or flocculant and fluid stream; for example, in embodiments lacking a pump and instead relying on gravity to effectuate the fluid flow into the secondary separator, such agitators may be desirable.

In some of the embodiments in which an agglomeration zone 320 is present, there may further be provided a diffuser, such as that shown in FIG. 4 and numbered element 424, disposed between the agglomeration zone and the clarifying zone. Diffuser 424 may include a plurality of diffuser ports 446, wherein the number and size of the ports 446 may be selected to promote uniform fluid flow into the clarification zone and/or to inhibit the fluid bulk flow velocity from exceeding the maximum desired value. While the total volume of fluid flowing into the clarifying zone would remain the same with or without a diffuser, the diffuser tends to even out the distribution of the fluid into the clarifying zone. The diffuser may also reduce the speed at which individual fluid molecules enter the clarifying zone (that is, the diffuser may reduce the bulk flow velocity). The diffuser may thereby prevent fluid from flowing into and then out of the clarifying zone without allowing solids to fall out of the fluid (that is, short-circuiting the clarification process).

In embodiments having both a diffuser with an energy displacement sub-zone, as it would have the there may be an additional effect of dispersing fluid throughout the volume of the agglomeration zone, thereby increasing the likelihood of exploiting the full area of the diffuser.

Similarly, in some embodiments the diffuser is selected to prevent the fluid bulk flow velocity from reaching a level at which the entry of the fluid stream into the clarification zone would significantly disturb the settled solids in the thickening zone (sometimes known as "scouring"); this maximum desired bulk flow velocity may easily be determined by the skilled technician, and will vary depending on factors such as the distance of thickening zone from the point(s) at which the fluid stream enters the clarifying zone, the slope of the thickening zone walls, etc.

Where shallower thickening zone wall angles are desired (for example, to further lessen the total height of the apparatus, such as to facilitate transport of the secondary separator to and from various sites), the thickening zone may include a displacer for urging the settled solids towards the removal zone, such as for example sweepers, scrapers, plows. In one embodiment, where at least one wall is angled less than 45°, the displacer may be a piston driven scraper that slides up and down the angled wall. In embodiments including such scrapers, sweepers or plows, the wall angles of at least one of the thickening zone walls may be reduced to provide very shallow slopes (which may improve transportability of the apparatus), such as 5° to 15°, or even approaching 0°, from the horizontal. In embodiments having a single-walled thickening zone, the wall may define a substantially frusto-conical structure, while in embodiments including a thickening zone having a plurality of walls, the walls may define a pyramidal or other such structure.

The thickening zone may optionally include a picket assembly for drawing through the settled solids and releasing gases and liquids trapped therein, thereby facilitating further compaction of the settled solids. The picket assembly may take any number of forms; for example, without limitation, in embodiments having a frusto-conical thickening zone, the picket assembly may comprise a rake radially movable about the cone axis. Moreover, in embodiments including a displacer for urging the settled solids into the removal zone, such displacer may be coupled to a picket assembly.

Figure 6B:
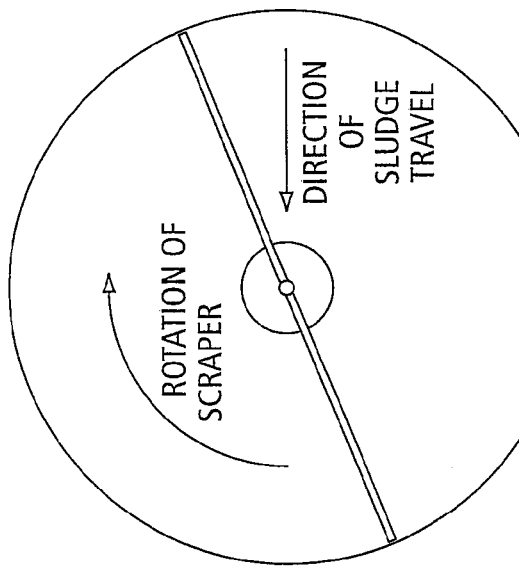
FIGS. 6a and 6b are a side elevation view of an embodiment of a thickening zone and a removal zone, and a top view of an embodiment of a removal zone, respectively.
Figure 6A:
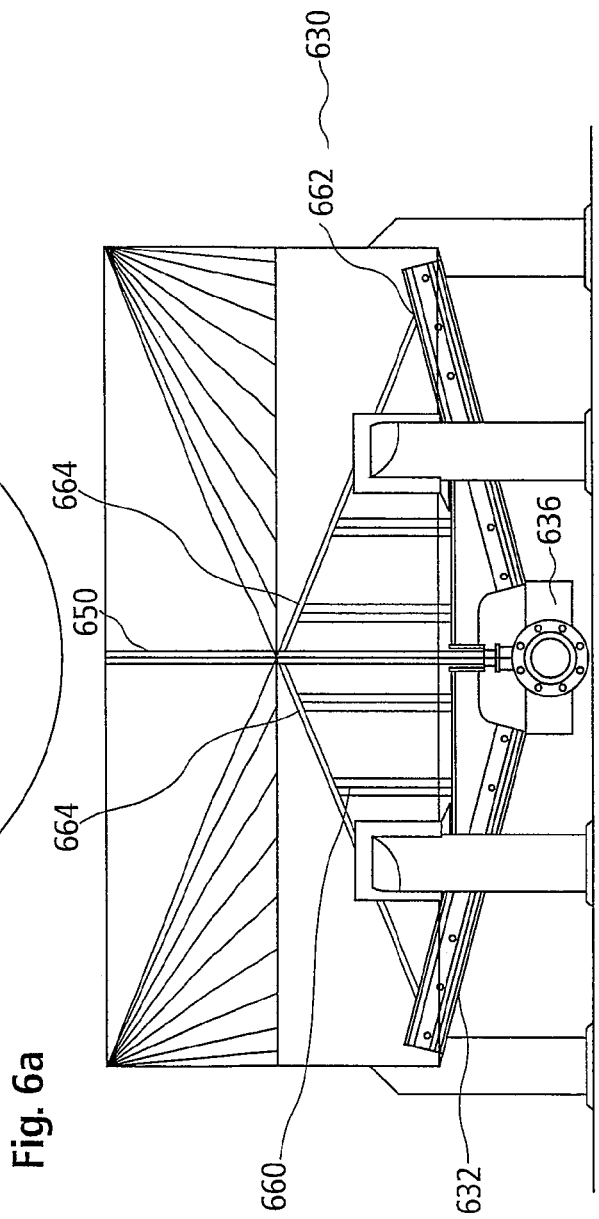

An embodiment of a displacer is shown in FIGS. 6a and 6b. Referring to FIGS. 6a and 6b, in the thickening zone 630 pickets 660 extend upwardly from displacer 662 to form an assembly 634 that is coupled to a coaxial drive shaft 650 and motor to impart radial movement about the cone axis to the assembly. For greater stability, the assembly 634 may further include supports 664 coupling the pickets 660 to the drive shaft 650. As displacer 662 moves radially along the thickening zone inclined wall 632 urging the lowest layers of settled solids into the removal zone 636, the pickets 660 move through the upper layers of settled solids de-aerating and de-watering. In other embodiments having a flat-walled thickening zone, the picket assembly may be drawn laterally through the settled solids. In various embodiments, the picket assembly may be configured to additionally urge the settled solids into the removal zone; whether or not the picket assembly is configured for such a purpose, the passage of the picket assembly through the settled solids may still have some effect of moving settled solids towards the removal zone as some displacement of those solids is caused by the motion of the picket assembly through them. The geometry of the pickets may be varied, although it has been found that a wedge configuration (wherein the leading edge of the wedge is pointed in the direction of rotation) can efficiently create a low pressure zone in the wake of the assembly as it moves through the settled solids; this has the advantage of further thickening the solids blanket as solids move to fill in the low pressure zone.

Referring again to FIG. 2, settled solids are taken out of the secondary separator 214 from the removal zone 236 through open bottom end 248 by a solids pump 242 such as a suction pump. However, it is to be understood that other removal devices may be employed, including for example an auger; in this connection, such an auger could include a first end inside the thickening zone and a second end outside the secondary separator, wherein the rotation of the auger would displace the settled solids from the first end to the second end. Whatever the device removing the settled solids from the apparatus that is selected, the apparatus may optionally include one or more sensors for ascertaining the density, thickness, mass, etc., of the settled solids so as to allow the speed of the solids pump or auger to be varied accordingly. Thus, the feed rate of secondary fluid stream into the secondary separator can also be slowed down or sped up depending upon the speed of removal of the settled solids. For example, it may be desirable to slow down the removal device if the settled solids form a particularly thin layer in the thickening zone or if there is too much liquid remaining associated with the settled solids. Such sensor(s) may be placed downstream of the removal device.

Figure 7:
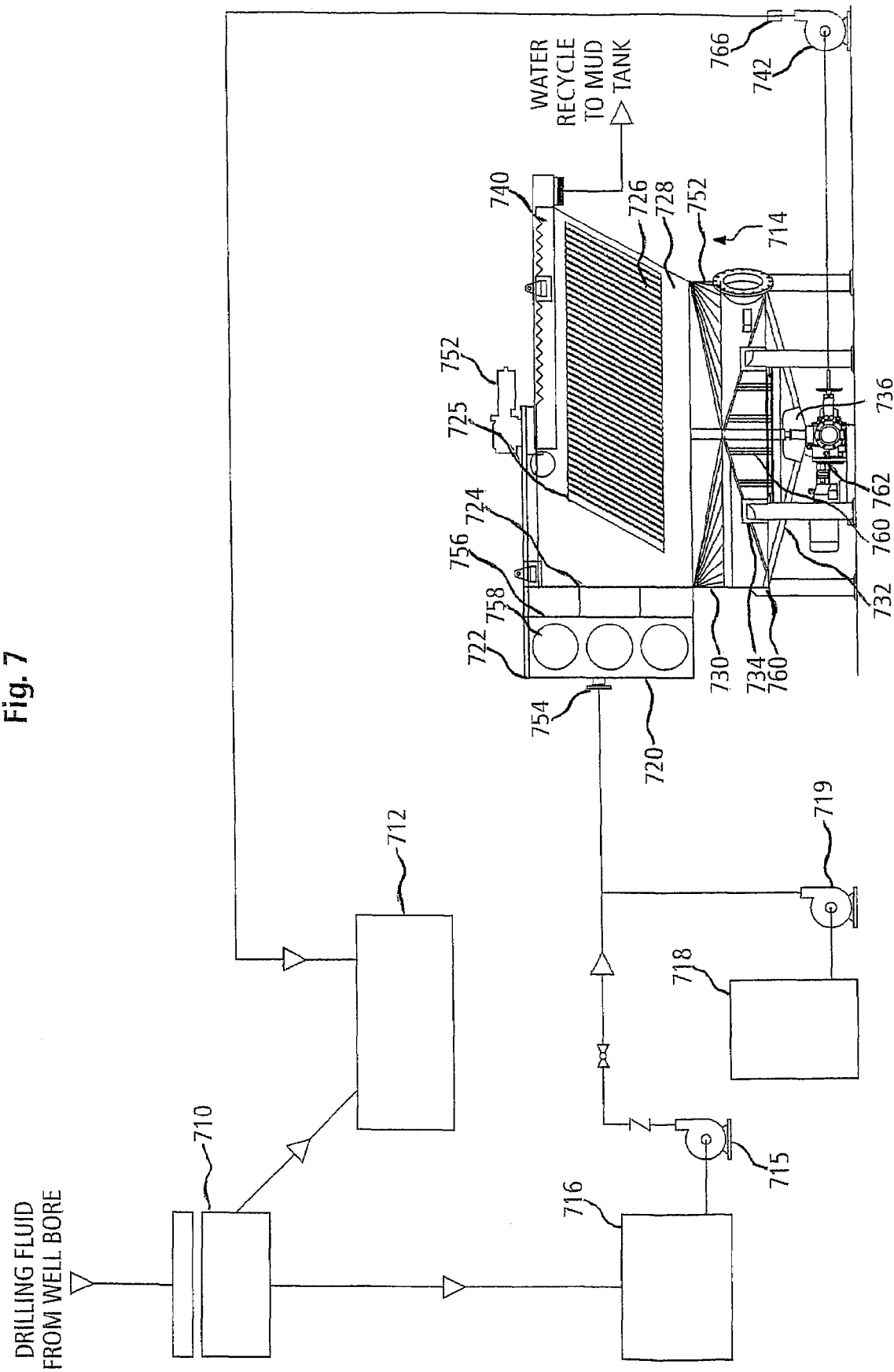
FIG. 7 is a flow diagram representing another embodiment of the inventive process.

Another embodiment of the inventive process is illustrated in FIG. 7. Referring now to FIG. 7, drilling fluid from the wellbore is passed through a primary separator 710, which includes one or more of a shale shaker, hydrocyclone, and centrifuge, in order to separate coarse solids from the drilling fluid. The separated solids are disposed into a solids tank 712, while the remaining fluid fraction, the secondary fluid stream, is passed into a receiving tank 716. From receiving tank 716, the secondary fluid stream is pumped via pump 715 towards secondary separator 714 and agglomerant from agglomerant tank 718 is introduced into the secondary fluid stream (in order to help separate fine solids) via pump 719; the resulting mix of secondary fluid stream and agglomerant is referred to as the tertiary fluid stream. As the tertiary fluid stream is pumped into the agglomeration zone 720 of the secondary separator 714, it enters energy displacement subzone 722 through inlet 754 and collides with obstacle 756 in the fluid flow path. The collision of the tertiary fluid stream with obstacle 756 results in rolling or turbulent flow of the tertiary fluid stream, causing further mixing of the agglomerant with the fine solids of the tertiary fluid stream and causing dissipation of some of the energy of the tertiary fluid stream. The thus-diverted tertiary fluid stream leaves the energy displacement subzone 722 through one or more outlets 758 and enters the rest of the agglomeration zone 720. From agglomeration zone 720, the tertiary fluid stream passes through ports of diffuser 724 and into clarifying zone 726 at or below the top edges 725 of inclined plates 728, where it flows among the plates 728. As the solids in the tertiary fluid stream agglomerate, they fall out of suspension either of their own accord or upon striking the undersides of plates 728, with the result that the higher the level of the tertiary fluid stream in relation to the plates 728, the more clarified the fluid. The clarified fluid overflowing the top edges 725 of plates 728 flows into launders 740 and out of the secondary separator 714. The agglomerating solids, on the other hand, descend into thickening zone 730 and settle upon frusto-conical wall 732 having an angle of less than 45° from the horizontal, whereupon the weight of subsequent descending solids compress the settled solids. The settled solids are further compressed by the movement of thickening pickets 760 through them, and are urged towards removal zone 736 by displacer 762; as shown in FIG. 7, displacer 762 and pickets 760 together form assembly 734 which is coupled to and radially driven about the cone axis by coaxial drive shaft 750 and motor 752. The settled solids are drawn out of the secondary separator 714 by solids pump 742 and disposed into solids tank 712. In order to determine the optimal speed at which solids pump 742 removes the settled solids, one or more sensors 766 downstream of solids pump 742 may ascertain the density, thickness, mass, or other characteristic of the settled solids being pumped out, and signal to the solids pump 742 to speed up or slow down accordingly.

What is claimed is:

1. An apparatus for treating fluid comprising solids and liquids to produce clarified fluid, comprising:
    (a) an agglomeration zone having an inlet for receiving the fluid and at least one fluid outlet, the agglomeration zone comprising an energy displacement sub-zone including a flow path obstacle disposed therein in substantially facing relation to the fluid inlet and having two ends, operative to turbulently mix an agglomerant with the fluid to agglomerate a portion of the solids therein while dissipating the energy of the fluid said at least one fluid outlet disposed proximately perpendicular to at least one of said ends;
    (b) a clarification zone in fluid communication with the outlet of the agglomeration zone, the clarification zone comprising a plurality of spaced apart clarifying plates to promote the settling of the solids from the clarification zone to produce clarified fluid; and
    (c) a thickening zone disposed below and in fluid communication with the clarification zone for receiving the settling solids and comprising at least one wall defining a downwardly diminishing cross-sectional area;
    wherein the outlet of the agglomeration zone directs the fluid to exit the agglomeration zone towards the plurality of clarifying plates.

2. The apparatus of claim 1, the at least one wall being angled no more than 45°.

3. The apparatus of claim 2, further comprising a displacer disposed proximally parallel to the at least one wall for displacing solids therefrom.

4. The apparatus of claim 3, wherein the thickening zone wall comprises a frusto-conical configuration and the displacer is selected from the group consisting of radial scrapers, radial sweepers, and radial plows.

5. The apparatus of claim 1, further comprising a removal device disposed above the plates for removing clarified fluid.

6. The apparatus of claim 5, wherein the removal device comprises at least one launder.

7. The apparatus of claim 1, wherein the thickening zone further comprises thickening pickets for passing through and releasing liquids and gases from settled solids in the thickening zone.

8. The apparatus of claim 1, further comprising a removal zone for collecting and removing settled solids, the removal zone being communicatingly disposed proximal to a bottom edge of the at least one wall of the thickening zone.

9. The apparatus of claim 8, wherein the removal zone comprises an auger having a first end extending into the removal zone and a second end outside the removal zone, the auger for rotatingly displacing the settled solids from the first end to the second end.

10. The apparatus of claim 9, further comprising a sensor for sensing and transmitting information about at least one characteristic of the settled solids, said characteristic being selected from the class consisting of density, thickness, and mass, and a receiver for receiving said information and for varying the auger's rotation speed in accordance with said information.

11. The apparatus of claim 8, further comprising a removal pump for removing settled solids from the removal zone.

12. The apparatus of claim 11, further comprising a sensor for sensing and transmitting information about at least one characteristic of the settled solids, said characteristic being selected from the class consisting of density, thickness, and mass, and a receiver for receiving said information and for varying the pump's speed in accordance with said information.

13. The apparatus of claim 1, the at least one wall being angled no more than 60°.

14. The apparatus of claim 1, further comprising a diffuser disposed between the agglomeration zone and the clarification zone and having a plurality of ports sized to permit passage of agglomerated solids therethrough.

15. An apparatus for separating solids from a fluid to produce a clarified fluid, comprising:
    (a) an agglomeration zone for treating the fluid with an agglomerant to agglomerate a portion of the solids therein to form a treated fluid;
    (b) a clarification zone in fluid communication with the agglomeration zone comprising a plurality of spaced apart clarifying plates to promote the settling of the solids in the treated fluid to produce the clarified fluid;

(c) a diffuser disposed between the agglomeration zone and the clarification zone having a plurality of ports sized to permit passage of the treated fluid including agglomerated solids therethrough at a substantially uniform flow in a substantially horizontal direction into the clarification zone; and at or below a top edge of the clarifying plates; and (d) a thickening zone disposed below and in fluid communication with the clarification zone for receiving the settling solids and comprising at least one wall defining a downwardly diminishing cross-sectional area.

16. The apparatus of claim 15, the at least one wall being angled no more than 45°.

17. The apparatus of claim 16, further comprising a displacer disposed proximally parallel to the at least one wall for displacing solids therefrom.

18. The apparatus of claim 17, wherein the thickening zone wall comprises a frusto-conical configuration and the displacer is selected from the group consisting of radial scrapers, radial sweepers, and radial plows.

19. The apparatus of claim 15, further comprising a removal device disposed above the plates for removing clarified fluid.

20. The apparatus of claim 19, wherein the removal device comprises at least one launder.

21. The apparatus of claim 15, wherein the thickening zone further comprises thickening pickets for passing through and releasing liquids and gases from settled solids in the thickening zone.

22. The apparatus of claim 15, further comprising a removal zone for collecting and removing settled solids, the removal zone being communicatingly disposed proximal to a bottom edge of the at least one wall of the thickening zone.

23. The apparatus of claim 22, wherein the removal zone comprises an auger having a first end extending into the removal zone and a second end outside the removal zone, the auger for rotatingly displacing the settled solids from the first end to the second end.

24. The apparatus of claim 22, further comprising a removal pump for removing settled solids from the removal zone.

25. The apparatus of claim 24, further comprising a sensor for sensing and transmitting information about at least one characteristic of the settled solids, said characteristic being selected from the class consisting of density, thickness, and mass, and a receiver for receiving said information and for varying the pump's speed in accordance with said information.

26. The apparatus of claim 15, the at least one wall being angled no more than 60°.

27. The apparatus of claim 15, further comprising a sensor for sensing and transmitting information about at least one characteristic of the settled solids, said characteristic being selected from the class consisting of density, thickness, and mass, and a receiver for receiving said information and for varying the auger's rotation speed in accordance with said information.

28. The apparatus of claim 15, wherein the agglomeration zone further comprises an energy displacement sub-zone for dissipating energy of the fluid.

* * * * *